United States Patent [19]

Baker et al.

[11] Patent Number: 4,575,633

[45] Date of Patent: * Mar. 11, 1986

[54] PYROELECTRIC INFRARED RADIATION DETECTOR

[75] Inventors: Geoffrey Baker; Patrick J. R. Ball; Martin Renals, all of Southampton, England

[73] Assignee: US Philips Corporation, New York, N.Y.

[*] Notice: The portion of the term of this patent subsequent to Dec. 18, 2001 has been disclaimed.

[21] Appl. No.: 509,617

[22] Filed: Jul. 1, 1983

[30] Foreign Application Priority Data

Jul. 23, 1982 [GB] United Kingdom ............... 8220816

[51] Int. Cl.⁴ ............................................. G01J 1/00
[52] U.S. Cl. ................................. 250/338; 250/342
[58] Field of Search ............ 250/338 R, 338 PY, 342, 250/346, 551, 340, 352; 328/2, 3; 357/23 GP; 174/52 H; 340/567, 595; 374/121, 178

[56] References Cited

U.S. PATENT DOCUMENTS

| | | | |
|---|---|---|---|
| 3,539,803 | 11/1970 | Beerman | 374/178 |
| 4,198,564 | 4/1980 | Baker et al. | 250/338 |
| 4,336,452 | 6/1982 | Baker | 250/338 |
| 4,459,484 | 7/1984 | Tar | 250/340 |
| 4,489,238 | 3/1984 | Baker | 250/338 |

FOREIGN PATENT DOCUMENTS 1504283 2/1978 United Kingdom .

Primary Examiner—Janice A. Howell
Attorney, Agent, or Firm—Marc D. Schechter

[57] ABSTRACT

An infrared radiation detector for an intruder alarm has a pyroelectric element comprising a pyroelectric body sandwiched between two electrodes. The element is supported above a header by two leads of a microminiature circuit package. The package is mounted on its back on the header. One lead of the circuit package is electrically connected to the element. The other lead is insulated from the element. A second pyroelectric element may similarly be supported by two leads of the package.

20 Claims, 5 Drawing Figures

PYROELECTRIC INFRARED RADIATION DETECTOR

BACKGROUND OF THE INVENTION

This invention relates to an infrared radiation detector. The detector has an envelope with a base. A pyroelectric element, having a body of pyroelectric material sandwiched between two electrodes, is present inside the envelope and is maintained spaced from the base by two support members. A circuit arrangement has at least one circuit element electrically connected to one of the electrodes of the pyroelectric element. The circuit arrangement is encapsulated within a package which is fastened to the base inside the envelope. The package has protruding conductive leads connected to the circuit arrangement. One of the support members is one of the conductive leads.

An infrared radiation detector employing a pyroelectric element can be used, for example, in an intruder alarm. It is because the intruder is a moving source of infrared radiation that his presence can be detected. The infrared radiation emitted by the intruder is converted by the detector into an electric signal which can be used to actuate an alarm.

It is usual to mount the pyroelectric element in an envelope. In order to isolate the detector from detrimental environmental effects and for optimum performance at low frequencies, the pyroelectric element is fixed spaced from a base part of the envelope. This minimizes heat transfer from other parts of the detector to the pyroelectric element, and it lengthens the thermal time constant.

A basic infrared radiation detector may comprise a single pyroelectric element sandwiched between two electrodes. As the pyroelectric element has a relatively high impedance, it is customary to include in the detector a circuit element which acts an amplifier stage or impedance matching stage. The circuit element may be a field effect transistor (hereinafter referred to as an FET). The gate of the FET is connected to one of the two electrodes of the pyroelectric element.

In more sophisticated detectors, the circuitry which is located in the proximity of and in the same envelope as the pyroelectric element may be more complex. For example, U.S. Pat. No. 4,198,564 (corresponding to United Kingdom patent GB No. 1,580,403) describes a detector which also includes a nonlinear network. The network protects the gate of the FET from excessive voltages resulting from large or sudden changes in input radiation.

As described in that patent, the pyroelectric element is maintained spaced from the base of the envelope by a U-shaped plinth member. The circuit elements which are located in the proximity of the pyroelectric element(s) are unencapsulated chips. The various electrical connections to these chips are made by bonded wires. Unfortunately, the technique of bonding wires to the relatively small contact areas of unencapsulated chips is both expensive and difficult to perform accurately, so that the yield of usefully bonded detectors can be undesirably low.

Another problem which results from the use of unencapsulated chips is the difficulty of performing certain desirable tests on the chip. For example, the measurements of low leakage current and low voltage noise in the circuit elements are difficult. These tests can, of course, be carried out after the chips have been included in the detector. However, then defective chips cannot be identified until the detector is virtually complete. It can be expensive to test the chips at this late stage because a defective chip then results in the rejection not only of the chip itself, but also of the whole detector of which that chip is a part.

These problems are overcome by the invention described and claimed in U.S. Pat. No. 4,489,238. In that case one of the electrodes of the pyroelectric element is connected to a circuit arrangement which is encapsulated within a so-called microminiature package. This package is mounted on the base inside the envelope and has protruding conductive leads connected to the circuit arrangement. The pyroelectric element is maintained spaced from the base by two support members, one of which is formed by one of the conductive leads of the package. The other support member is a separate pillar.

SUMMARY OF THE INVENTION

According to the present invention an infrared radiation detector comprises an envelope with a base, and a pyroelectric element having a body of pyroelectric material sandwiched between two electrodes. The pyroelectric element is present inside the envelope and is maintained spaced from the base by two support members. The detector further includes a circuit arrangement having at least one circuit element electrically connected to one of the electrodes of the pyroelectric element. The circuit arrangement is encapsulated within a package which is mounted on the base inside the envelope. The package has protruding conductive leads connected to the circuit arrangement. One of the support members is one of the conductive leads. The other support member is a further conductive lead of the package.

By using the leads of the encapsulating package not only to support the pyroelectric element but also to make the electrical connection between the circuit element and the pyroelectric element, the total number of bonded wires in a complete detector can be significantly reduced compared with the detector disclosed in U.S. Pat. No. 4,198,564.

Moreover, for any electrical connections which are still made to the circuit arrangement by wire bonds, the tolerances are much less severe because of the larger contact areas of the protruding leads of the package. As a result, detectors can be made more simply, at lower cost, and with increased yields.

The use of a circuit arrangement encapsulated within a package is particularly beneficial not only because assembly of the detector is simplified, but also because the constituent circuit elements can then be tested before the circuit arrangement is fixed in the detector. By identifying and rejecting unsuitable packages at this early stage, the yield of useful detectors can be further increased. Moreover, the encapsulation provides the benefit of shielding the circuit elements from visible radiation which may leak into the envelope and which might otherwise cause a false alarm by generating an undesired photosignal.

The encapsulating package may be a so-called microminiature package. This is essentially a small block of plastic material encapsulating one or more circuit elements. Conductive leads which extend from the side faces of the package are connected electrically to the circuit elements as appropriate.

The package has two major faces and the conductive leads, for their major part, extend transverse thereto. In addition, the ends of the leads extend parallel to one of the major faces for connection purposes.

It is conventional to mount a microminiature package such that is leads extend toward a supporting surface such as a printed circuit board. In this case, the leads of the microminiature package are connected to appropriate conductors on the circuit board. However, as will become clearer from the following description, if a microminiature package is used in a detector according to the invention, it is mounted so that its conductive leads extend away from the supporting surface (i.e. away from the base of the envelope). As compared with the conventional mode of mounting, the microminiature package is now effectively upside down.

In contrast with the detector described and claimed in U.S. Pat. No. 4,489,238, the pyroelectric element of the present detector is supported by two conductive leads of the encapsulating package rather than by one such lead and a separate pillar. Unexpectedly, this arrangement substantially decreased microphonic signals (i.e. undesirable signals generated by mechanical shock or vibration). This decrease is believed to be due to the reduced contact area between the supporting members and the base of the envelope. This is a most important advantage, for example in intruder alarms, because the detector is less likely to trigger a false alarm.

In order that the two circuit leads supporting the pyroelectric element may be connected to different circuit elements, it is preferable that the pyroelectric element is electrically connected to a first supporting lead an electrically insulated from a second supporting lead.

The detector may comprise one or two pyroelectric elements connected in series. A detector with two such elements, usually referred to as a 'Dual' detector, may be formed either from two separate pyroelectric bodies, each sandwiched between two electrodes, or from a common pyroelectric body having two electrodes on one side and a common electrode on the opposite side, overlapping the other two electrodes.

If both pyroelectric elements are to be insulated from supporting leads on the same side of the encapsulating package, it is advantageous to use a common insulating filament seated between the supporting leads and a side face of the package. To achieve the appropriate insulation the pyroelectric elements are fastened to a part of the filament extending parallel to the supporting leads.

DESCRIPTION OF THE PREFERRED EMBODIMENTS

Figure 1:
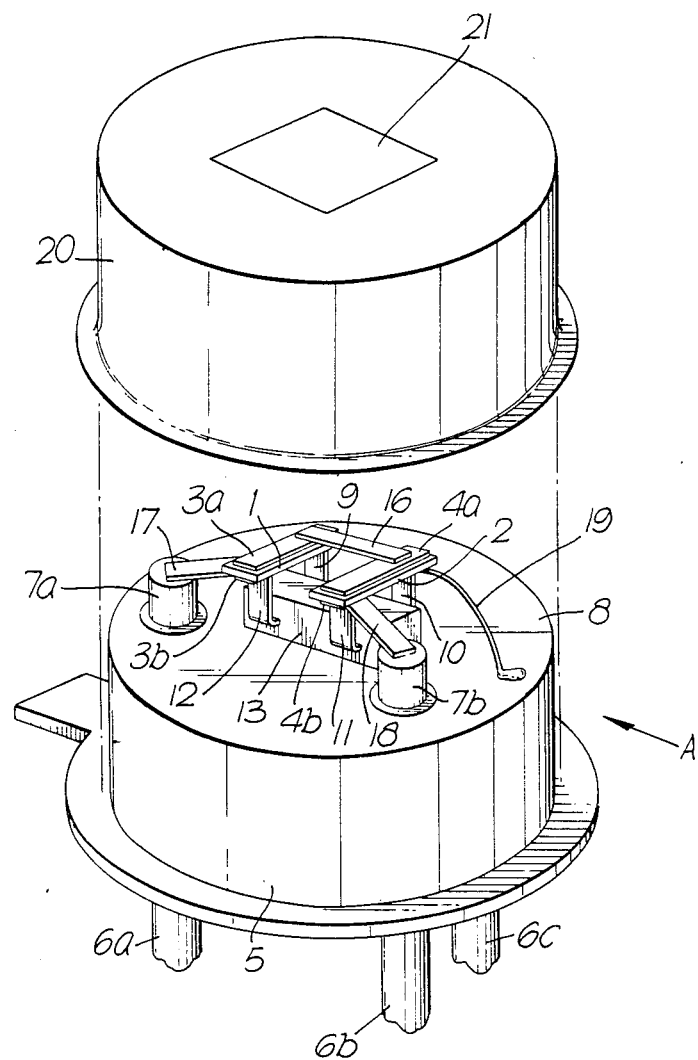
FIG. 1 is an expanded, perspective view of an infrared radiation detector according to the invention.

The infrared radiation detector shown in FIG. 1 is a dual detector comprising two pyroelectric elements 1 and 2 formed from two separate bodies of pyroelectric material. The pyroelectric material may be lanthanum and manganese doped lead zirconate titanate. For more information about this material, see United Kingdom Patent GB No. 1,504,283.

The pyroelectric body of each element 1 and 2 is sandwiched between two nichrome electrodes 3a and 3b and 4a and 4b, respectively. The uppermost electrodes 3a and 4a are substantially transparent to infrared radiation at the wavelength at which the detector is responsive. The electrodes 3a, 3b, 4a, and 4b cover the majority of the major surfaces of the elements 1 and 2.

The pyroelectric elements 1 and 2, which may be 2 mm.×1 mm.×150 microns, are spaced apart from the supporting surface of a substrate. The substrate may be the base of an envelope in the form of a three lead header 5 which may have a conventional TO-5 configuration. Two of the leads 6a and 6b extend through the header 5 to form two posts 7a and 7b, respectively. Posts 7a and 7b protrude above a substantially flat surface 8 of the header 5. The third lead 6c is electrically connected to the surface 8.

The pyroelectric elements 1 and 2 are each maintained spaced from the surface 8 by two conductive leads 9 and 10 and 11 and 12, respectively. Leads 9, 10, 11 and 12 protrude from a side face of a so-called microminiature package 13. Package 13 is essentially a small rectangular block of plastic material encapsulating a circuit arrangement, as explained above.

Figure 2:
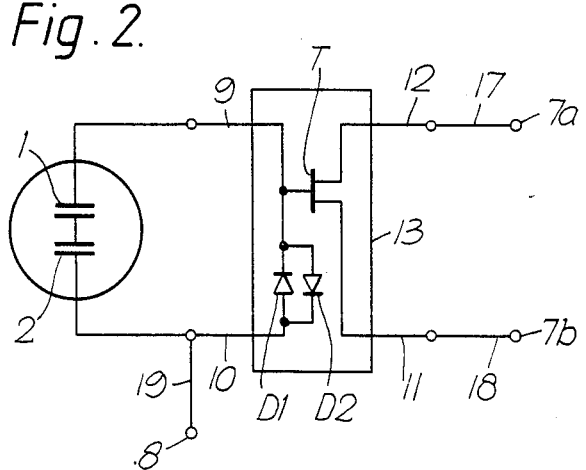
FIG. 2 schematically shows a circuit arrangement for the detector of FIG. 1.

As shown in FIG. 2, the circuit arrangement comprises a field effect transistor T and two diodes D1 and D2. The diodes are connected to each other in parallel, but with opposite polarity to form a two lead network. One lead of the network is connected to the gate of transistor T.

The package 13 is a four lead device. Two tab-like leads extend symmetrically from each of two opposite side faces of the package. The package dimensions are approximately 2.85 mm.×1.25 mm.×0.8 mm. Using an epoxy adhesive the package 13 is fixed centrally to the surface 8 by one of its major flat faces such that the protruding leads 9, 10, 11, and 12 extend away from surface 8.

Figure 3:
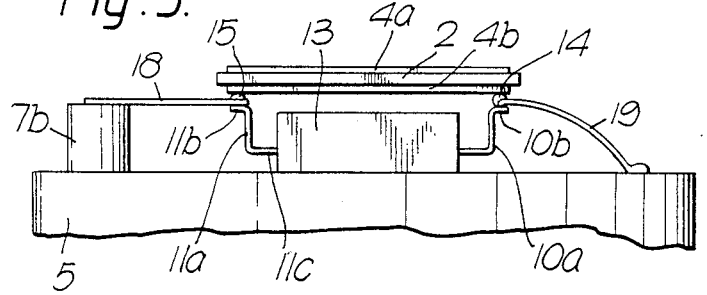
FIG. 3 is an elevational view of part of the FIG. 1 detector in the direction of the arrow A.

Each lead 9, 10, 11, and 12 has a main portion in the form of a leg (10a and 11a in FIG. 3) which is approximately perpendicular to the surface 8 of base 5. Each leg extends above the upper face of the microminiature package 13. The leads 9, 10, 11, and 12 also each have end portions remote from the package 13 in the form of feet (10b, and 11b in FIG. 3). The feet are transverse to the legs and extend substantially parallel to surface 8.

The electrodes 3b and 4b of the pyroelectric elements 1 and 2, respectively, bear on the feet of the leads. The electrodes are secured to the feet using a conductive adhesive 14 for leads 9 and 10 and a nonconductive adhesive 15 for leads 11 and 12. (See FIG. 3.) The conductive adhesive may be Ablebond 36/2 (Trade Mark) available from Ablestik Laboratories, U.S.A.. The nonconductive adhesive may be a conventional epoxy adhesive.

The electrode 4b of pyroelectric element 2 is electrically connected to surface 8, and so to the lead 6c of header 5, by means of a wire 19. Wire 19 is bonded to lead 10 and the surface 8.

An electrical connection is made between the electrodes 3a and 4a using a conductive foil strap 16 which may be made of gold. This strap 16 is bonded to the electrodes 3a and 4a using a conductive adhesive.

The two leads 11 and 12 of the microminiature package 13 are insulated from the pyroelectric elements by the insulating adhesive 15. Leads 12 and 11 are electrically connected to the leads 6a and 6b, respectively, of the header 5 via the posts 7a and 7b respectively. This connection may be made by straps 17 and 18, which may be a metal foil such as gold. The strap 17 bears on post 7a and the foot 12b of lead 12. The strap 18 similarly bears on post 7b and foot 11b of lead 11. These straps 17 and 18 can be secured using an electrically conductive adhesive.

Instead of using metal foil for the straps 16, 17, and 18, metal bars or wires may be used instead.

The electric circuit set up by the circuit elements in package 13 and the pyroelectric elements 1 and 2 is shown in FIG. 2. As is conventional, the pyroelectric elements 1 and 2 are represented as capacitors. For more detailed information about this circuit arrangement, see U.S. Pat. No. 4,198,564. Briefly, in this circuit the diode arrangement protects the gate of the field effect transistor T (which forms part of an impedance matching circuit) from excessive voltages and progressively limits the pyroelectric voltage resulting from large changes in ambient temperature.

The detector is completed by securing a conventional envelope cover member 20 to the rim of the header 5 in known manner. The cover member 20 has a window 21 above the pyroelectric elements 1 and 2. Window 21 is transparent to infrared radiation.

Figure 4:
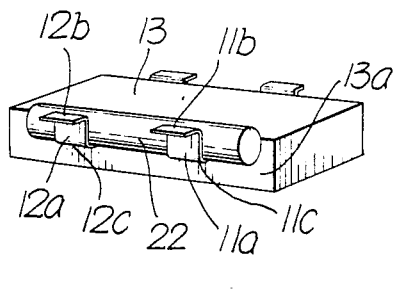
FIG. 4 is a perspective view of an insulating filament.
Figure 5:
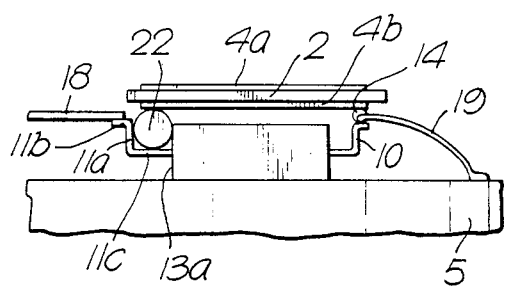
FIG. 5 is a side elevational view of part of a detector including the filament of FIG. 4.

To ensure good electrical insulation between the pyroelectric elements and the conductive leads 11 and 12, it may be preferable to include a separate intermediate insulating member apart from the insulating adhesive 15. For example a common filament 22 (FIG. 4) of insulating material, such as nylon, may be fastened with a conventional epoxy adhesive between the legs 11a and 12a of the leads 11 and 12 and the side face 13a of the microminiature package 13. The diameter of the filament 22 is such that it extends parallel to and above the end portions 11b and 12b of the leads 11 and 12. The pyroelectric elements 1 and 2 are fastened using a conventional epoxy adhesive to the parts of the filament above the conductive leads. (See FIG. 5.) The transverse portions 11c and 12c of the conductive leads, which extend into the sides of the package 13, act as stops for the filament 22.

The detector described so far is a dual detector comprising two pyroelectric elements formed from two separate bodies of pyroelectric material. Alternatively, the two pyroelectric elements may be formed from a common pyroelectric body having two individual electrodes on a first major surface and a single common electrode on a second opposite major surface. This single body can replace the separate pyroelectric elements 1 and 2 shown in FIG. 1. In this case, the two individual electrodes face the surface 8 of header 5. The common electrode is directed away from that surface. The two individual electrodes are fastened directly or indirectly to the leads 9, 10, 11, and 12 of the microminiature package 13 as previously described.

The invention is also applicable to infrared radiation detectors comprising a single pyroelectric element sandwiched between two electrodes. If such an element is used with the microminiature package described above, then lead 9 of the package 13 supports and is electrically connected to the element at one end. Lead 12 supports but is electrically insulated from the element at the opposite end. The upper electrode of the element is conductively connected to lead 10 of the package 13, for example, with a strap of conductive foil.

The leads 11 and 12 of package 13 are connected to the posts of the header as described above.

Of course the package 13 may contain a circuit arrangement different from that described above. For example, it may contain a single circuit element such as a field effect transistor. In this case the package only has three conductive leads extending therefrom. These leads are connected respectively to the gate, source and drain of the transistor. The lead connected to the gate can be used to support one end of a single pyroelectric element, the lower electrode of this element being conductively bonded to that lead. The other end of the single element can be supported by, but electrically insulated from, the lead connected either to the source or the drain of the transistor. The source and drain leads are electrically connected to the posts of the header as before and the upper electrode of the element is connected electrically to the base of the header, for example, with a wire bond.

We claim:
1. An infrared radiation detector comprising:
a substrate having a supporting surface;
a pyroelectric element comprising a body of pyroelectric material sandwiched between two electrodes;
two support members for supporting the pyroelectric element on and for spacing the pyroelectric element from the supporting surface; and
a circuit arrangement having at least one circuit element electrically connected to one of the electrodes;
characterized in that:
the circuit arrangement is encapsulated in a package which has at least first and second protruding conductive leads electrically connected to the circuit arrangement;
the circuit arrangement package is mounted on the supporting surface; and
the two support members are the first and second protruding conductive leads.

2. An infrared radiation detector as claimed in claim 1, characterized in that:
the circuit arrangement package has a substantially flat face which is fixed to the supporting surface; and
the protruding leads extend away from the supporting surface.

3. An infrared radiation detector as claimed in claim 2, characterized in that each protruding lead extends up from the supporting surface and has an end portion remote from the package which extends substantially parallel to the supporting surface, the pyroelectric element bearing on the end portions.

4. An infrared radiation detector as claimed in claim 3, characterized in that the pyroelectric element is electrically connected to the first protruding conductive lead and is electrically insulated from the second protruding conductive lead.

5. An infrared radiation detector as claimed in claim 4, characterized in that:
the detector further comprises a second pyroelectric element comprising a body of pyroelectric material sandwiched between two electrodes;
the circuit arrangement package has at least third and fourth protruding conductive leads electrically connected to the circuit arrangement, said third and fourth protruding conductive leads supporting the second pyroelectric element on and spacing the second pyroelectric element from the supporting surface; and the second pyroelectric element is electrically connected to the third protruding conductive lead and is electrically insulated from the fourth protruding conductive lead.

6. An infrared radiation detector as claimed in claim 5, characterized in that the pyroelectric elements are insulated from the second and fourth protruding conductive leads by a common insulating filament arranged between the second and fourth protruding conductive leads and the circuit arrangement package.

7. An infrared radiation detector as claimed in claim 6, characterized in that the circuit arrangement comprises:
a field effect transistor having a gate electrically connected to the first protruding conductive lead; and
first and second diodes having first and second opposite poles, the first pole of the first diode being electrically connected to the second pole of the second diode and to the gate, the first pole of the second diode being electrically connected to the second pole of the first diode and to the third protruding conductive lead.

8. An infrared radiation detector as claimed in claim 7, characterized in that:
the substrate has two conductive leads which extend through the substrate to form two contact posts on the supporting surface;
the field effect transistor has a source electrically connected to the second protruding conductive lead and a drain electrically connected to the fourth protruding conductive lead; and
the second protruding conductive lead is electrically connected to one contact post, and the fourth protruding conductive lead is electrically connected to the other contact post.

9. An infrared radiation detector as claimed in claim 5, characterized in that the circuit arrangement comprises:
a field effect transistor having a gate electrically connected to the first protruding conductive lead; and
first and second diodes having first and second opposite poles, the first pole of the first diode being electrically connected to the second pole of the second diode and to the gate, the first pole of the second diode being electrically connected to the second pole of the first diode and to the third protruding conductive lead.

10. An infrared radiation detector as claimed in claim 9, characterized in that:
the substrate has two conductive leads which extend through the substrate to form two contact posts on the supporting surface;
the field effect transistor has a source electrically connected to the second protruding conductive lead and a drain electrically connected to the fourth protruding conductive lead; and
the second protruding conductive lead is electrically connected to one contact post, and the fourth protruding conductive lead is electrically connected to the other contact post.

11. An infrared radiation detector as claimed in claim 3, characterized in that:
the detector further comprises a second pyroelectric element comprising a body of pyroelectric material sandwiched between two electrodes;
the circuit arrangement package has at least third and fourth protruding conductive leads electrically connected to the circuit arrangement, said third and fourth protruding conductive leads supporting the second pyroelectric element on and spacing the second pyroelectric element from the supporting surface; and
the second pyroelectric element is electrically connected to the third protruding conductive lead and is electrically insulated from the fourth protruding conductive lead.

12. An infrared radiation detector as claimed in claim 11, characterized in that the pyroelectric elements are insulated from the second and fourth protruding conductive leads by a common insulating filament arranged between the second and fourth protruding conductive leads and the circuit arrangement package.

13. An infrared radiation detector as claimed in claim 12, characterized in that the circuit arrangement comprises:
a field effect transistor having a gate electrically connected to the first protruding conductive lead; and
first and second diodes having first and second opposite poles, the first pole of the first diode being electrically connected to the second pole of the second diode and to the gate, the first pole of the second diode being electrically connected to the second pole of the first diode and to the third protruding conductive lead.

14. An infrared radiation detector as claimed in claim 13, characterized in that:
the substrate has two conductive leads which extend through the substrate to form two contact posts on the supporting surface;
the field effect transistor has a source electrically connected to the second protruding conductive lead and a drain electrically connected to the fourth protruding conductive lead; and
the second protruding conductive lead is electrically connected to one contact post, and the fourth protruding conductive lead is electrically connected to the other contact post.

15. An infrared radiation detector as claimed in claim 2, characterized in that the pyroelectric element is electrically connected to the first protruding conductive lead and is electrically insulated from the second protruding conductive lead.

16. An infrared radiation detector as claimed in claim 1, characterized in that the pyroelectric element is electrically connected to the first protruding conductive lead and is electrically insulated from the second protruding conductive lead.

17. An infrared radiation detector as claimed in claim 1, characterized in that each protruding lead extends up from the supporting surface and has an end portion remote from the package which extends substantially parallel to the supporting surface, the pyroelectric element bearing on the end portions.

18. An infrared radiation detector as claimed in claim 17, characterized in that:
the detector further comprises a second pyroelectric element comprising a body of pyroelectric material sandwiched between two electrodes;
the circuit arrangement package has at least third and fourth protruding conductive leads electrically connected to the circuit arrangement, said third and fourth protruding conductive leads supporting the second pyroelectric element on and spacing the second pyroelectric element from the supporting surface; and
the second pyroelectric element is electrically connected to the third protruding conductive lead and is electrically insulated from the fourth protruding conductive lead.

19. An infrared radiation detector as claimed in claim 18, characterized in that the pyroelectric elements are insulated from the second and fourth protruding conductive leads by a common insulating filament arranged between the second and fourth protruding conductive leads and the circuit arrangement package.

20. An infrared radiation detector as claimed in claim 19, characterized in that the circuit arrangement comprises:

a field effect transistor having a gate electrically connected to the first protruding conductive lead; and first and second diodes having first and second opposite poles, the first pole of the first diode being electrically connected to the second pole of the second diode and to the gate, the first pole of the second diode being electrically connected to the second pole of the first diode and to the third protruding conductive lead.

* * * * *